United States Patent
Nicolini et al.

(10) Patent No.: US 9,122,711 B1
(45) Date of Patent: Sep. 1, 2015

(54) SIMPLIFIED SYSTEM BACKUP PROTECTION AND RECOVERY

(75) Inventors: Mark J. Nicolini, Orlando, FL (US); Rick A. Wildes, Oviedo, FL (US); John E. Slawsky, Heathrow, FL (US); Check A. Sabjan, Sanford, FL (US); John W. Alexander, Redmond, WA (US); Kirk Freiheit, Lake Mary, FL (US); Eric W. Shaffer, Lake Mary, FL (US); Ynn-Pyng Tsaur, Oviedo, FL (US); Gregory R. Dowers, II, Lake Mary, FL (US)

(73) Assignee: Symantec Corporation, Mountain View, CA (US)

( * ) Notice: Subject to any disclaimer, the term of this patent is extended or adjusted under 35 U.S.C. 154(b) by 321 days.

(21) Appl. No.: 13/479,936

(22) Filed: May 24, 2012

(51) Int. Cl.
*G06F 17/30* (2006.01)
*G06F 11/14* (2006.01)

(52) U.S. Cl.
CPC .... *G06F 17/30289* (2013.01); *G06F 17/30067* (2013.01); *G06F 11/1451* (2013.01); *G06F 11/1479* (2013.01)

(58) Field of Classification Search
CPC .................. G06F 17/30575; G06F 17/30067; G06F 17/30174; G06F 17/30194; G06F 17/1469; G06F 17/30289; G06F 11/1451; G06F 11/1456; G06F 11/1458; G06F 11/1479; G06F 11/1469
USPC ........... 707/647, 672, 779, 651, 679; 711/112
See application file for complete search history.

(56) References Cited

U.S. PATENT DOCUMENTS

| | | |
|---|---|---|
| 5,598,563 A | 1/1997 | Spies |
| 5,708,604 A | 1/1998 | Fontana et al. |
| 5,708,654 A | 1/1998 | Arndt et al. |
| 5,715,456 A | 2/1998 | Bennett et al. |
| 5,732,282 A | 3/1998 | Provino et al. |
| 5,802,365 A | 9/1998 | Kathail et al. |
| 5,890,204 A | 3/1999 | Ofer et al. |
| 6,078,990 A | 6/2000 | Frazier |
| 6,170,055 B1 | 1/2001 | Meyer et al. |
| 6,185,686 B1 | 2/2001 | Glover |
| 6,279,011 B1 | 8/2001 | Muhlestein |
| 6,346,954 B1 | 2/2002 | Chu et al. |
| 6,535,998 B1 | 3/2003 | Cabrera et al. |
| 6,640,291 B2 | 10/2003 | Fujibayashi et al. |
| 6,654,769 B2 | 11/2003 | Ito et al. |
| 6,654,830 B1 | 11/2003 | Taylor et al. |

(Continued)

OTHER PUBLICATIONS

U.S. Appl. No. 11/690,634, filed Mar. 23, 2007, Okan Okcu.

(Continued)

*Primary Examiner* — Jean M Corrielus
(74) *Attorney, Agent, or Firm* — Rory D. Rankin; Meyertons, Hood, Kivlin, Kowert & Goetzel, P.C.

(57) ABSTRACT

A system, method, and medium for automatically identifying, protecting, and recovering the critical services and components of a server. A backup application detects a request to perform a backup operation. In response, the backup application performs a discovery process to identify the critical services and components of a server. The backup application includes a user interface to display the critical services and components to an administrator. The critical services and components are then backed up to a backup storage device. The collection of critical services and components can then be recovered to a target server when a recovery operation is needed.

20 Claims, 8 Drawing Sheets

(56) References Cited

U.S. PATENT DOCUMENTS

| | | | |
|---|---|---|---|
| 6,671,778 | B2 | 12/2003 | Naberhuis et al. |
| 6,681,323 | B1 | 1/2004 | Fontanesi et al. |
| 6,725,715 | B2 | 4/2004 | Igarashi et al. |
| 6,735,715 | B1 | 5/2004 | Graham |
| 6,745,207 | B2 | 6/2004 | Reuter et al. |
| 6,748,429 | B1 | 6/2004 | Talluri et al. |
| 6,760,787 | B2 | 7/2004 | Forin |
| 6,820,035 | B1 | 11/2004 | Zahavi |
| 6,820,214 | B1 | 11/2004 | Cabrera et al. |
| 6,836,830 | B1 | 12/2004 | Yamagami et al. |
| 6,925,541 | B2 | 8/2005 | Yamagami |
| 6,948,038 | B2 * | 9/2005 | Berkowitz et al. ............ 711/162 |
| 6,954,824 | B2 | 10/2005 | Burton et al. |
| 6,999,913 | B2 | 2/2006 | Hensley |
| 7,007,144 | B2 | 2/2006 | Nakanishi et al. |
| 7,065,769 | B1 | 6/2006 | Tolopka |
| 7,107,534 | B1 | 9/2006 | De Jong et al. |
| 7,164,809 | B2 | 1/2007 | Beyrouti |
| 7,287,257 | B2 | 10/2007 | Meza |
| 7,293,272 | B1 | 11/2007 | Okcu et al. |
| 7,322,010 | B1 * | 1/2008 | Mikula .................. 715/734 |
| 7,334,157 | B1 | 2/2008 | Graf et al. |
| 7,346,799 | B2 * | 3/2008 | Uhlmann et al. .................. 714/2 |
| 7,356,679 | B1 * | 4/2008 | Le et al. ............................ 713/1 |
| 7,395,282 | B1 * | 7/2008 | Crescenti et al. ..................... 1/1 |
| 7,395,387 | B2 * | 7/2008 | Berkowitz et al. ............ 711/162 |
| 7,418,478 | B1 * | 8/2008 | Orling et al. .................. 709/207 |
| 7,418,619 | B1 * | 8/2008 | Uhlmann et al. .................. 714/2 |
| 7,549,028 | B2 * | 6/2009 | Thompson et al. ........... 711/162 |
| 7,624,133 | B1 * | 11/2009 | Ojalvo ................................. 1/1 |
| 7,680,957 | B1 * | 3/2010 | Ketterhagen et al. ......... 709/246 |
| 7,769,990 | B1 | 8/2010 | Okcu et al. |
| 7,877,351 | B2 * | 1/2011 | Crescenti et al. ............. 707/609 |
| 7,886,185 | B1 | 2/2011 | Okcu et al. |
| 8,024,292 | B2 * | 9/2011 | Thompson et al. ........... 707/640 |
| 8,041,673 | B2 * | 10/2011 | Crescenti et al. ............. 707/609 |
| 8,099,392 | B2 * | 1/2012 | Paterson et al. ............... 707/654 |
| 8,132,186 | B1 | 3/2012 | Okcu et al. |
| 8,261,126 | B2 * | 9/2012 | Sosnosky et al. ............... 714/13 |
| 8,566,278 | B2 * | 10/2013 | Crescenti et al. ............. 707/610 |
| 8,566,289 | B2 * | 10/2013 | Paterson et al. ............... 707/654 |
| 8,713,060 | B2 * | 4/2014 | Sivasubramanian et al. . 707/802 |
| 2003/0159070 | A1 | 8/2003 | Mayer et al. |
| 2003/0195995 | A1 | 10/2003 | Tabbara |
| 2004/0003135 | A1 | 1/2004 | Moore |
| 2004/0236916 | A1 * | 11/2004 | Berkowitz et al. ............ 711/162 |
| 2005/0125460 | A1 | 6/2005 | Yu et al. |
| 2007/0180290 | A1 * | 8/2007 | Stevenson et al. ................ 714/5 |
| 2008/0307347 | A1 * | 12/2008 | Cisler et al. .................... 715/771 |
| 2011/0289409 | A1 * | 11/2011 | Batey et al. .................... 715/705 |

OTHER PUBLICATIONS

U.S. Appl. No. 11/351,778, filed Mar. 23, 2007, Okan Okcu.
"Breaking Through the Dissimilar Hardware Restore Challenge", White Paper: System Recovery, Symantec Corporation, Copyright 2006, pp. 1-16.
"Recovery Manager® 3.0 User's Guide", http://www.winternals.com/Documentation/UsersGuides/RecoveryManager-v3.0-UsersGuide.pdf, 105 pages.
"Automated System Recovery with VERITAS Netbackup", VERITAS Bare Metal Restore, White Paper, VERITAS Software Corp., 2002, pp. 1-10.
Roman, Steven, "Windows Architecture", Chapter 9 from Win32 API Programming with Visual Basic, published by O'Reilly and Associates, Inc., 2000 Microsoft Corporation, 6 pages.
"Automated Deployment Services Technical Overview", Microsoft Corporation, Aug. 2003, pp. 1-25.
"CBMR-Dissimilar Hardware Recovery", CMB Support, Jun. 2005, 9 pages.
"AIX Change Management Software Upgrade, Preparation and Implementation", http://www.eservercomputing.com/ibmunix/tis/index.asp?sid=20&id=506&p=1, Dec. 2000, 9 pages.
"Introducing IBM Tivoli Configuration Manager", http://publib.boulder.ibm.com/tividd/td/ITCM/GC23-4703-00, 2000, 11 Pages.
Goodwin, Ron M., "Ignite-UX System Recovery", http://www.interex.org/pubcontent/enterprise/mar00/17goodwi.html, 2000, 10 pages.
"PowerQuest Drive Image 7.0", User Guide, May 2003 PowerQuest Corp., pp. 43-63.
"Drive Image 2002", PowerQuest Corp. 2002, 2 pages.
"VERITAS Backup Exec 9.1 for Windows Servers", Intelligent Disaster Recovery Option, White Paper, VERITAS Software Corp, 2003, pp. 1-9.
"How Volume Shadow Copy Services Work", http://www.microsoft.com/technet/prodtechnol/windowserver2003/library/TechRef/2b0d2457-b7d8-42c3-b6c9-59c145b7765f.mspx, Mar. 28, 2003, 7 pages.
"Managing Windows Packages," VERITAS NetBackup Bare Metal Restore 6.0, System Administrator's Guide for Unix, Windows, and Linux, Sep. 2005, Chapter 10, pp. 163-166.
Office Action in U.S. Appl. No. 10/788,120, mailed Apr. 6, 2007.
Office Action in U.S. Appl. No. 10/774,039, mailed Apr. 19, 2007.
Bryan Leech, "PC-Update Online!" http://www.melbpc.org.au/pcupdate/2003/2003article8.htm, Reprinted from the Mar. 2000 issue of PC Update, the magazine of Melbourne PC User Group, Australia, 4 pages.
Final Office Action mailed Jan. 27, 2009 in U.S. Appl. No. 11/351,778 Okcu, et al.
"Back up your programs, system settings, and files", Microsoft Windows, 2014, http://windows.microsoft.com/en-us/windows/backup-programs-system-settings-files#1TC=windows-7, 2 pages. [Retrieved Aug. 27, 2014].
"Symantec System Recovery Small Business Server Edition—The gold standard in disaster recovery", Symantec Corporation, 2014, http://www.symantec.com/system-recovery-small-business-server-edition, 2 pages. [Retrieved Aug. 27, 2014].
"Backup & Recovery 14 Home—Powerful Backup. Ultimate Recovery.", Paragon Software Group, 2014, http://www.paragon-software.com/home/brh/index.html, 2 pages. [Retrieved Aug. 27, 2014].
"Online Backup, Cloud backup, and Data Backup Solutions", Mozy by EMC, http://mozy.com/#slide-5, 4 pages. [Retrieved Aug. 27, 2014].

* cited by examiner

SIMPLIFIED SYSTEM BACKUP PROTECTION AND RECOVERY

BACKGROUND OF THE INVENTION

1. Field of the Invention

The present invention relates generally to computer systems, and in particular to a method and system for protecting and recovering operating systems of computing devices.

2. Description of the Related Art

Various software tools exist for performing backups of computing devices and restoring the backed up versions of the data. Such tools allow for graceful recovery from user error, hardware failure, power outage, unexpected errors, disasters, or any other loss of data. Many of these tools require an administrator to separate the components and devices into those that are critical and those that are not. Unfortunately, this type of manual determination of what constitutes critical and non-critical devices is fraught with error. It is possible for an administrator to supervise a backup that the administrator believes is capable of restoring the system at some future point. However, unbeknownst to the administrator, the backup may be incapable of successfully restoring the operating system because some critical components were unintentionally left out. Unfortunately, the administrator may not realize the error until the restore operation fails, at which point it is too late to correct.

For example, a system may include a server hosting various applications. The administrator may have correctly identified and selected the critical devices in the original server configuration, but the critical services and components of the server may have changed over time, and the administrator may not have updated the selection of critical devices to match these changes. Therefore, the backup will not include all of the critical devices that are required to restore the operating system of the server.

Performing backup and restore operations may therefore require substantial human intervention to complete. The need for such intervention makes such tasks error-prone, tedious, and time-consuming. Improved approaches for handling the backup and restoration of critical system devices and components are therefore desired.

SUMMARY OF THE INVENTION

Various embodiments of methods and mechanisms for automating server backup and restore operations are disclosed. In one embodiment, a software application may be utilized for automating the backup and restore operations. The software application may include a user interface, and a list of all of the components of the server may be presented to an administrator through the user interface. This allows the administrator to select which components of the server to backup.

During the backup process, a discovery and interrogation process may determine the critical components of the server. The discovered critical components may be compared to the administrator's backup selections. If any critical components have been left out of the administrator's selections, then a message may be generated within the user interface to notify the administrator of these excluded critical components. In addition, the excluded critical components may be automatically included within the backup in spite of not being selected by the administrator.

When a new critical component or service is added to the server, this new component may be automatically included as part of the backup, even though the administrator may have chosen to exclude it. The addition of the new critical component may be logged, and feedback may be provided to the administrator informing them of this new addition.

The actual backup may be stored as separate sets of data, but metadata may be stored to link together the separate sets of data. The metadata may include information about the sets and may describe how the sets are associated. The metadata describes all of the critical components that should be in the backup, and the metadata may be considered a critical component.

The logic for the determination as to whether or not a particular service or component is critical may be encoded within the backup application. In one embodiment, the identification of which services and components are critical vs. non-critical may be based on a configuration file that is loaded by the backup application. The configuration file may be specific to the type of operating system being utilized by the server.

In one embodiment, a discovery and interrogation process may be performed as part of a backup to determine which server components are critical to the operating system (OS). In one embodiment, the server may run a Microsoft Windows OS, and the discovery and interrogation process may leverage a plurality of application programming interfaces (APIs). To perform the discovery and interrogation process, the system volume and the boot volume may be detected. API calls may be invoked as part of the discovery and interrogation process, and the API calls may utilize one or more win32 APIs, file system APIs, Volume Shadow Copy Service (VSS) defined APIs, and other APIs.

Also, the service control manager may be queried as part of the discovery and interrogation process. The auto-start services for the OS may be determined from the service control manager. Also, the user auto-start services for the OS may be determined, such as SQL, Exchange, and others. In addition, the location of the required executables may be determined from the service control manager. Furthermore, the backup application may look at the service control manager to find out where all the other critical applications are that must start with the OS so that there is not a failure.

In one embodiment, the user interface window generated for restore operations may split up the display of the system components into a first section of the critical components and a second section of the non-critical components. The non-critical components may include applications, application data, and user data. The display may show the administrator the required components and may show the additional components separately. This may allow the administrator to more easily determine which components are the critical components that should be included in a restore operation.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which.

DETAILED DESCRIPTION

Figure 1:
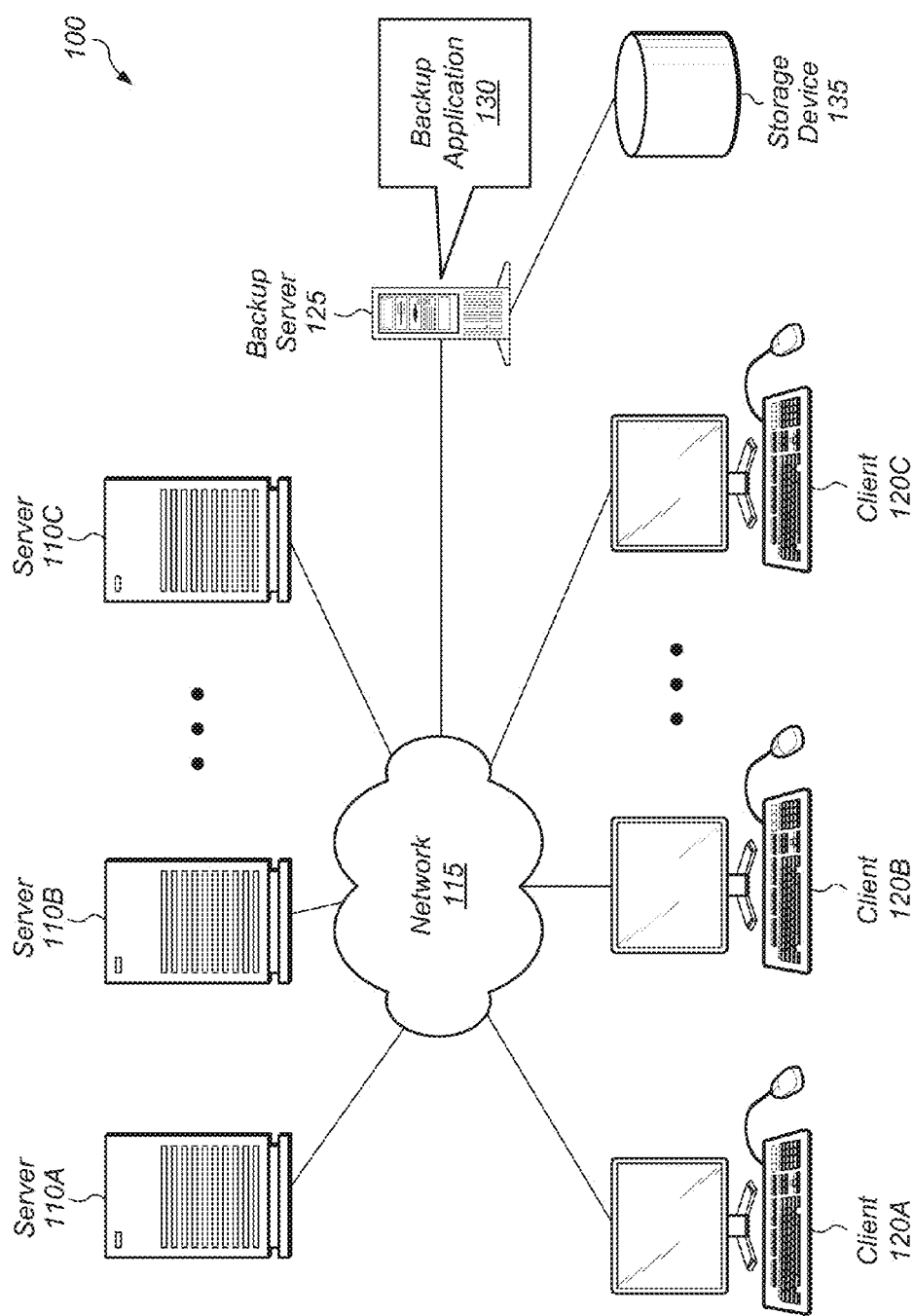
FIG. 1 is a diagram that illustrates a network environment in accordance with one or more embodiments.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

This specification includes references to "one embodiment". The appearance of the phrase "in one embodiment" in different contexts does not necessarily refer to the same embodiment. Particular features, structures, or characteristics may be combined in any suitable manner consistent with this disclosure. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A system comprising a server . . . ." Such a claim does not foreclose the system from including additional components (e.g., a storage device, a storage controller).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Referring now to FIG. 1, a block diagram of one embodiment of a network environment 100. The network environment 100 includes servers 110A, 110B, and 110C and clients 120A, 120B, and 120C. One or more of servers 110A-C may also be referred to as application servers or media servers. In various embodiments, servers 110A-C may be located at any number of locations. In one embodiment, two or more of servers 110A-C may be at a common location. Clients 120A-C are representative of any number of stationary or mobile computers such as servers, desktop personal computers (PCs), laptops, handheld computers, smartphones, tablet PCs, electronic reading devices, or other computing devices.

In network environment 100, servers 110A-C may execute a variety of applications to provide various types of services to clients 120A-C. For example, the servers 110A-C may execute front-end applications for internet web servers, back-end applications in support of various front-end applications, file backup and recovery applications, voice communications applications, video communications applications, email applications, instant messaging applications, database server applications, data processing applications, or other applications, or combinations thereof.

Servers 110A-C may be coupled to network 115 and may be accessible to clients 120A-C through network 115. Network 115 may comprise a variety of network connections including combinations of local area networks (LANs), such as Ethernet networks and Fibre Channel (FC) networks, and wireless local area networks (WLANs) based on the Institute of Electrical and Electronics Engineers (IEEE) 802.11 standards (Wi-Fi), and wide area networks (WANs), such as the Internet, cellular data networks, and other data communication networks such as a virtual private network (VPN) implemented over a public network (e.g., the Internet). Other network connections and architectures are possible and contemplated.

Servers 110A-C may also be coupled through network 115 to backup server 125. Backup server 125 may be coupled to storage device 135, and backup server 125 may execute backup application 130 for backing up data to and from servers 110A-C and storage device 135. Alternatively, backup server 125 may access storage device 135 via network 115. Storage device 135 is representative of any number of storage devices, and may comprise any of a variety of types of storage media, such as a hard disk drive, disk volume, server blade, flash drive, optical drive, tape drive, tape volume, robotic tape library, or other storage medium.

Backup application 130 may also be configured to restore data from storage device 135 to servers 110A-C. In some embodiments, backup application 130 may also be configured to backup data for clients 120A-C and restore data to clients 120A-C. An administrator or other user may configure backup application 130 to provide backup protection for the various servers 110A-C in network environment 100. Backup application 130 may include a user interface that allows an administrator to specify when server components and data should be backed up.

In various embodiments, backup software running on the servers 110A-C may be used to create and maintain backups of critical components. The term "critical components" may refer to components that are required for the operating system to start-up and execute without failure. The term "components" may refer to devices, services, applications, drivers, volumes, drives, folders, files, or other elements that are utilized by an operating system. In one embodiment, backup application 130 may load a configuration file with information on what types of components are critical for the specific operating system of a given server. The configuration file may also include information on how to locate the critical components for the specific operating system of the given server. Based on the information in the configuration file, backup application 130 may perform a discovery and interrogation process to identify and locate the critical components of servers 110A-C.

The information gathered in the discovery and interrogation process may be provided to backup server 125 by tools installed on the various computing devices of the distributed system. The gathering may be carried out by agents, scripts, daemons, or other tools running on servers 110A-C. Alternatively, or in addition, the monitoring and gathering of information may be performed by software running from a centralized location, such as backup server 125. These various tools may automatically seek and gather information relevant to the recovery of the operating system. The data collected during the discovery and interrogation process may be stored in backup server 125, in storage device 135, or in another location.

In some embodiments, a combination of software executing on backup server 125 and servers 110A-C may perform backup and restore operations. For example, in one embodiment, servers 110A-C may be configured to receive requests to perform backups and restores from agents or clients such as backup application 130 and, in response, to manage the backups and restores by scheduling and otherwise controlling performance of the backups and restores.

To assist in recovery operations that may be needed in the event of a disaster or other failure event, the servers 110A-C may be monitored by a simplified system protection tool. In one embodiment, the simplified system protection tool may be part of backup application 130. Alternatively, the simplified system protection tool may be implemented on one or more of the servers 110A-C. The simplified system protection tool may be configured to automatically backup and recover the critical components for each server in network environment 100, without user intervention.

Servers 110A-C, clients 120A-C, and backup server 125 may include various hardware and software components. The hardware components may include one or more processors, memory devices, and input/output (I/O) devices, connected together via a bus architecture. The software components may include an operating system stored in a memory device. The operating system may be any of various types of operating systems, such as Microsoft Windows®, Linux®, Unix®, Solaris®, Apple® Mac OS or iOS, Android®, or others. The operating system may be operable to provide various services to the user and may support the execution of various programs such as backup applications, restore applications, server applications, virtualization applications, deduplication engines, software agents, or any of a variety of other applications.

In other embodiments, the number and type of clients, servers, backup servers, networks, and storage devices is not limited to those shown in FIG. 1. Also, in other embodiments, other types of devices and computing resources may be included throughout the network environment. Any number and combination of servers, backup servers, mobile clients, and other computing devices may be interconnected in network architectures via various combinations of modem banks, direct LAN connections, wireless connections, WAN links, etc. Also, at various times one or more clients and servers may operate offline.

Figure 2:
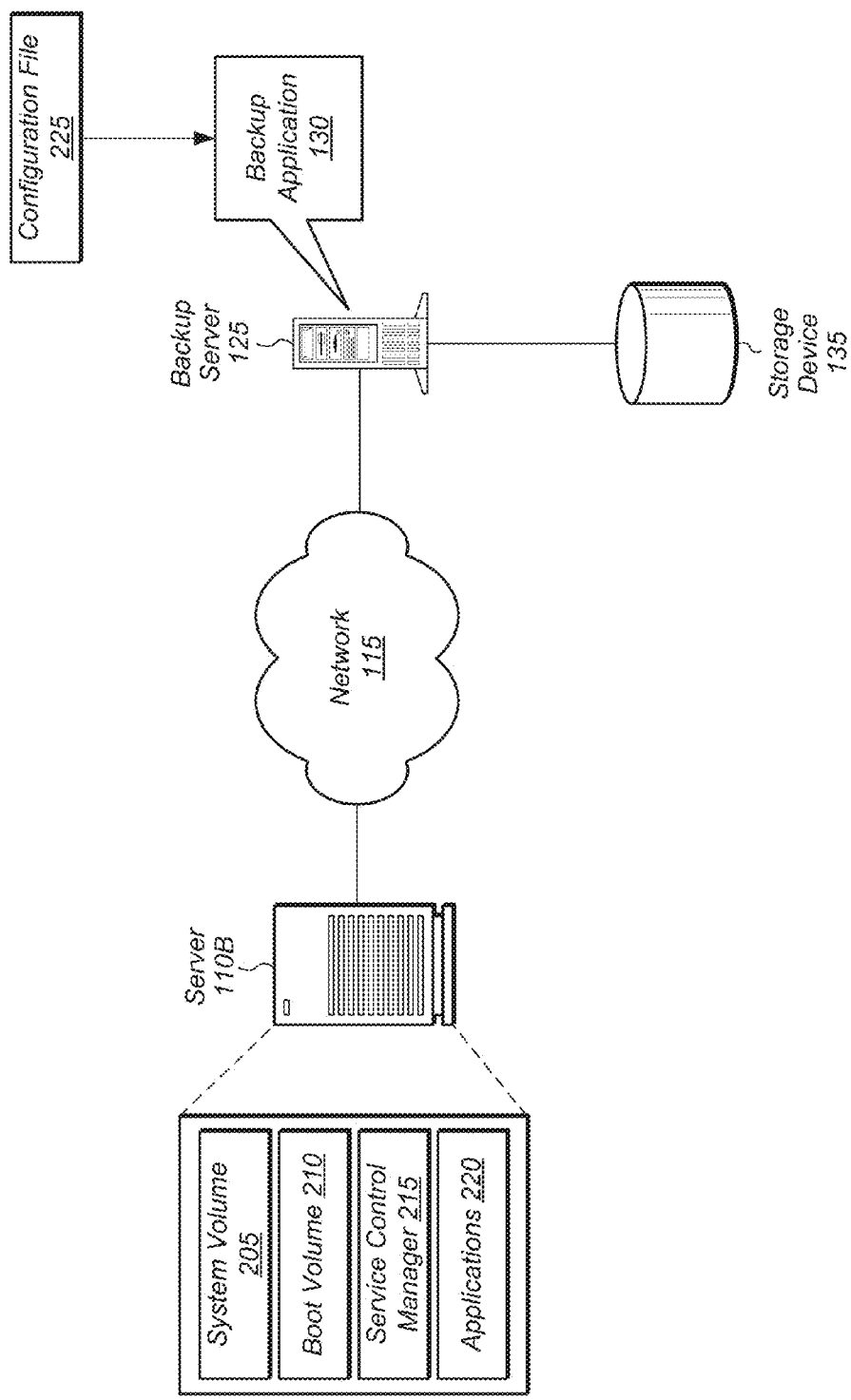
FIG. 2 illustrates one embodiment of components interrogated in a discovery process.

Turning now to FIG. 2, a block diagram of one embodiment of components interrogated in a discovery process is shown. Backup server 125 may be coupled to server 110B via network 115, and backup application 130 executing on backup server 125 may be configured to perform a backup of the critical operating system components of server 110B. Backup application 130 may also be configured to conditionally include non-critical components in the backup. Server 110B may execute software that assists backup application 130 with the backup process. In another embodiment, a backup application may execute on server 110B, and this backup application may perform backups independently of backup server 125. While backup application 130 is described as performing or being configured to perform certain steps or tasks, it is to be understood that other software applications or agents may be configured to perform these tasks, independently or in combination with backup application 130, in other embodiments.

Backup application 130 may perform a discovery process of server 110B as part of a backup job. In one embodiment, the discovery process may be the initial step in the backup job. The discovery process may involve interrogating server 110B to determine the current devices. Once the current devices have been determined, backup application 130 may identify which devices are critical and which devices are non-critical. In one embodiment, backup application 130 may access configuration file 225 which details what types of critical devices to search for and how to search for them based on the specific type of operating system used by the server being backed up. Configuration file 225 may include profile and configuration data that corresponds to a specific operating system. In one embodiment, configuration file 225 may be supplied by a vendor of the operation system. For example, in FIG. 2, server 110B may run a Microsoft Windows operating system, and so backup application 130 may load configuration file 225 which is specific to Windows. In other embodiments, other configuration files may be loaded for other operating systems (e.g., Unix, Linux, Solaris) which may be utilized by server 110B.

In one embodiment, a determination may be made as to whether a server is a candidate for participation in a simplified disaster recovery backup being performed by backup application 130 based on its operating system platform. It may be the case that some servers may be excluded from simplified disaster recovery backups. For example, servers running Windows OS may be able to participate in simplified disaster recovery backups while virtual clustered Windows OS servers may be excluded from participation. In some embodiments, various types of servers, such as servers that are clustered servers, clustered application servers, and distributed application servers, may not be candidates for the simplified disaster recovery backups.

In the example shown in FIG. 2, the discovery process may involve querying system volume 205, boot volume 210, and service control manager 215 of server 110B to determine the critical devices. System volume 205 may include the master boot record (MBR) and the BIOS. The auto-start services for the operating system may be determined from service control manager 215. Service types 0-2 may be considered critical, while service types 3 and higher may be considered non-critical. The location of the required executables may be determined from service control manager 215. Also, the user auto-start services for the operating system may also be determined, such as Structure Query Language (SQL) Server, Exchange, etc. Windows API calls may be invoked as part of the discovery process to obtain the critical device information. Also, VSS may be used to determine the operating system components. Applications 220 are representative of any non-critical applications or programs and non-critical data of server 110B, and applications 220 and associated data may be identified as non-critical components during the discovery process.

A discovery process may be performed each time backup application 130 performs a backup job. It is possible that new critical devices have been added or critical devices have been removed since the last backup job was performed, and so the discovery process may be performed each time a backup is performed. If any new critical devices are discovered, they may be automatically added to the backup without any user intervention. In some embodiments, the discovery process may be performed separately from a backup job, and data may be stored based on the results of the discovery process. Then, when the next backup job is performed, the stored results may be utilized to identify and backup the critical components.

Figure 3:
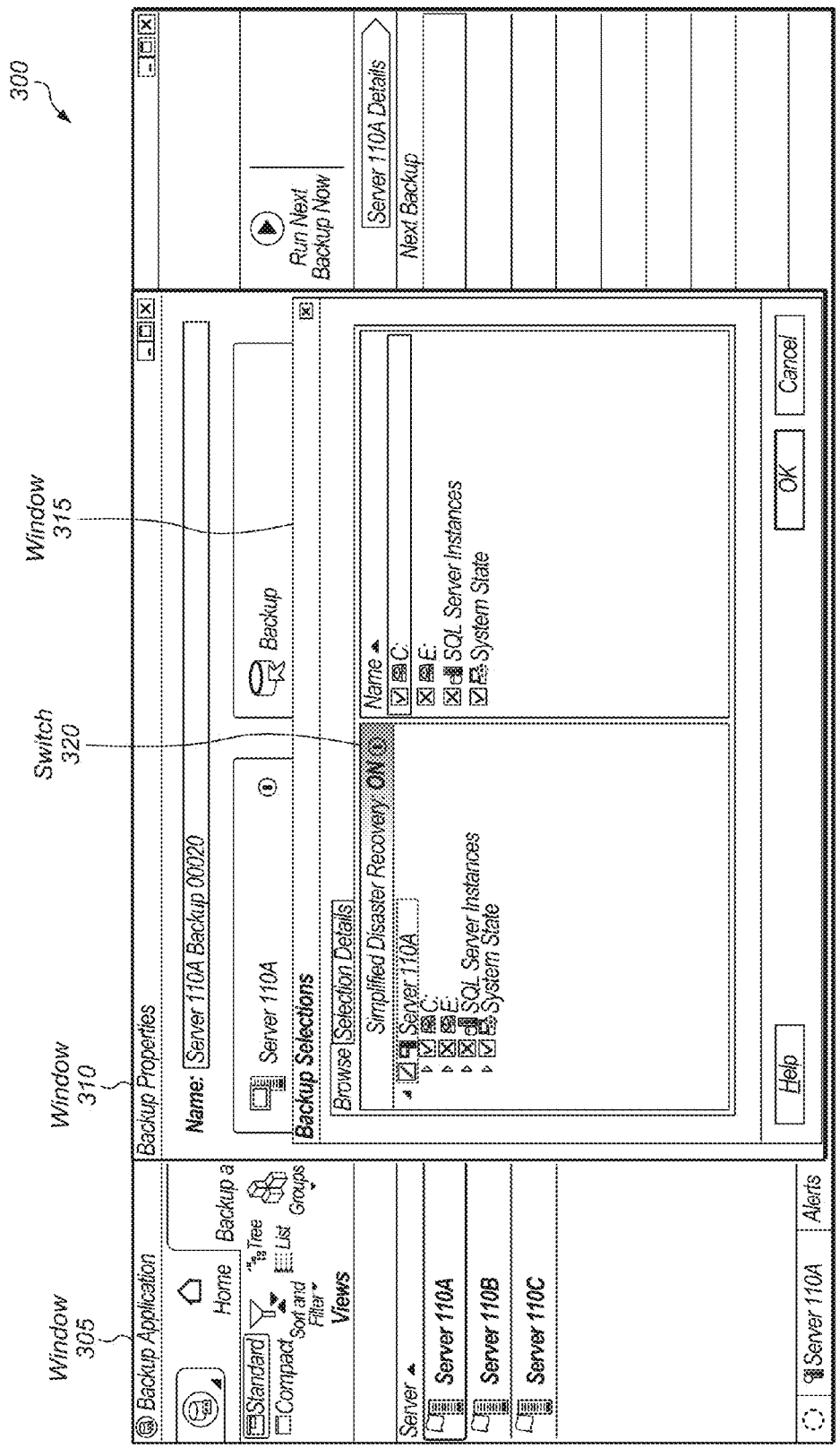
FIG. 3 is a diagram that illustrates a backup application user interface in accordance with one or more embodiments.

Turning now to FIG. 3, one embodiment of a backup application user interface is shown. The example of user interface 300 shown in FIG. 3 is illustrative of a user interface for a backup application operating in a Windows operating system environment. However, it is to be understood that other types of backup application user interfaces may be utilized with other operating system environments.

In one embodiment, window 305 of user interface 300 may list a plurality of servers which may be part of an overall system or data center. In the example shown in FIG. 3, the plurality of servers listed in window 305 includes servers 110A-C of network environment 100 (of FIG. 1). A server may be selected in window 305 by an administrator, and then a second window (window 310) may be generated with specific information for the chosen server. As shown in FIG. 3, server 110A has been selected in window 305, and as a result, window 310 is displayed for server 110A. Window 315 may be generated from window 310 to show the backup selection information for server 110A for a specific backup job.

As can be seen in window 315, switch 320 is on, which selects the simplified disaster recovery setting. The terms "simplified disaster recovery" and "simplified system protection tool" may be used interchangeably throughout this disclosure. When switch 320 is on, this enables the automatic protection of the critical operating system components of the chosen server (server 110A). In one embodiment, switch 320 may be set to "on" by default for all servers being protected by the backup application.

Window 315 displays the specific backup selections for server 110A according to one example of backup selections which may be chosen by an administrator. As can be seen in window 315, the C: volume and system state have been selected by an administrator for protection, as indicated by the checkmarks next to their entries in window 315. The C: volume and System State are the components that have been identified as critical components for the operating system of server 110A. The E: volume and SQL Server Instances are excluded, as shown with the 'X' in each of the boxes next to their names. The E: volume and SQL Server Instances are the components that have been identified as non-critical components. The examples of critical and non-critical components shown in window 315 are merely illustrative, and in other embodiments, other critical and non-critical components may be identified for a given server.

In one embodiment, if all of the entries of critical components have been selected, then switch 320 may be "on". If one of the critical components were excluded from the backup, then switch 320 may toggle to "off", which would indicate that at least one critical component was excluded. In another embodiment, if switch 320 is "on", then all critical components may automatically be selected. The administrator may then have the option to select one or more non-critical components to include in the backup.

Each server listed in window 305 may be monitored by the backup application. The backup application may maintain a list of the critical and non-critical components of each server, and the backup application may display these components in a pop-up window when the respective server is selected in window 305. In one embodiment, the critical components may be displayed in a first section of window 315 and the non-critical components may be displayed in a second section of window 315. It is noted that other embodiments of user interface 300 may utilize other numbers of windows, and some of the information shown in windows 305-315 may be organized within one or more windows in any suitable fashion.

Figure 4:
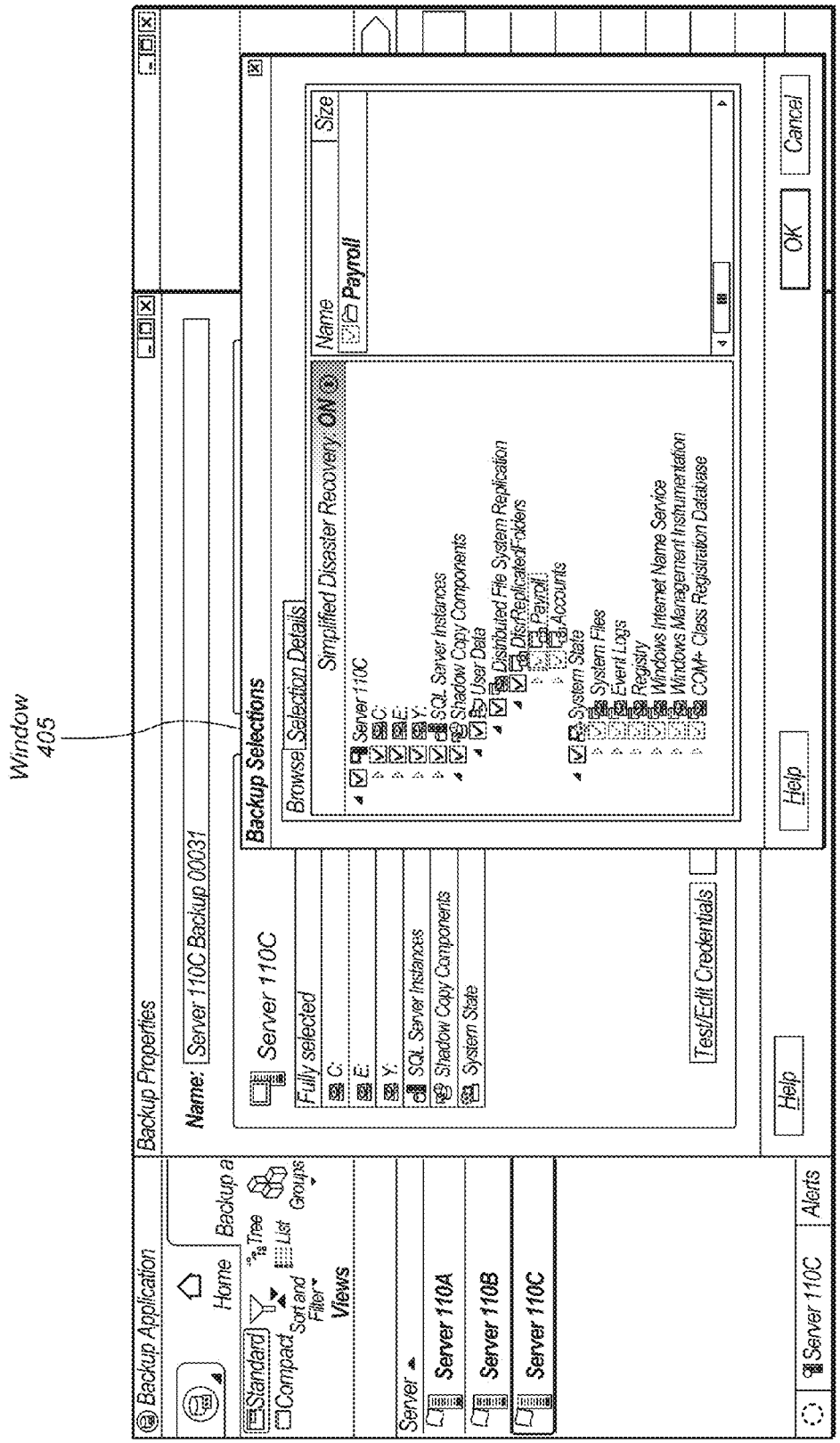
FIG. 4 is a diagram that illustrates another user interface in accordance with one or more embodiments.

Referring now to FIG. 4, another illustration of a user interface for a backup application is shown. As shown in FIG. 4, the user interface includes window 405 which lists the components that have been discovered for server 110C. Window 405 (labeled "Backup Selections") shows that simplified disaster recovery is enabled, which signifies that the critical operating system data for server 110C will be protected automatically during any backup jobs that are performed. The components that have been identified for server 110C are shown in the left pane of window 405, and these include the C: volume, E: volume, Y: volume, SQL Server Instances, Shadow Copy Components, and System State.

The Shadow Copy Components category has been expanded in the left pane of window 405, and this category includes user data, such as the distributed file system replication. The Payroll selection has been highlighted, and so the Payroll selection appears in the right pane of window 405. This is for illustrative purposes only, and other components may be selected in the left pane and then featured in the right pane of window 405. In one embodiment, the Shadow Copy Components listed in the left pane of window 405 may be identified as non-critical during the discovery process and may be excluded from the simplified disaster recovery backup jobs. Alternatively, in another embodiment, a portion or all of the Shadow Copy Components may be conditionally included in the simplified disaster recovery backup jobs. The administrator may choose to have some or all of the non-critical components included with the critical components that are backed up.

The System State category has also been expanded in the left pane of window 405. The listed System State components include System Files, Event Logs, Registry, Windows Internet Name Service, Windows Management Instrumentation, and COM+ Class Registration Database. These components may be identified as critical during the discovery process. In other embodiments, other components may be included within the System State Components listed in window 405.

In other embodiments, other critical services and components may be included. For example, in one embodiment, a server may have the following critical services and components: System Devices (Basic Input Output System (BIOS), Extensible Firmware Interface (EFI), Unified EFI (UEFI) and Utility Partition volumes), Boot Device (Executing Windows Operating System volumes), System Services Devices (Boot, System, and Auto Start Services volumes), and System State devices such as Active Directory, Background Intelligent Transfer Service (BITS), Certificate Services, Cluster Quorum, COM+ Class Registration Database, Dynamic Host Configuration Protocol (DHCP), Event Logs, File Server Resource Manager (FSRM), Internet Information Services, MS Search Service, Network Policy Server (NPS), Performance Counter, Registry, Remote Storage, Removable Storage Manager (RSM), Shadow Copy Optimization, System Files, SYSVOL, Task Scheduler, Terminal Server Licensing (TSL), Terminal Services Gateway (TSG), VSS Express Writer, Windows Deployment Services (WDS), Windows Internet Name Service (WINS), and Windows Management Instrumentation (WMI). In other embodiments, the critical services and components that may be part of an operating system for a given server may vary. The critical device information may be cached by the backup application and accessible for enumeration, browsing, protection, and recovery operations. The remaining discovered operating system devices and application may be deemed as non-critical devices. In one embodiment, these remaining devices and application may include user-defined volumes, application volumes, VSS User Data Writer Components, and application agents.

On subsequent protection operations, the critical device information may be compared to the most recent previous protection operation. If a new critical system device is introduced or removed subsequent to the previous protection operation, an indication of this may be logged and presented to the administrator via the user interface. Also, if an existing non-critical device turns critical, then it will be logged and automatically protected.

Figure 5:
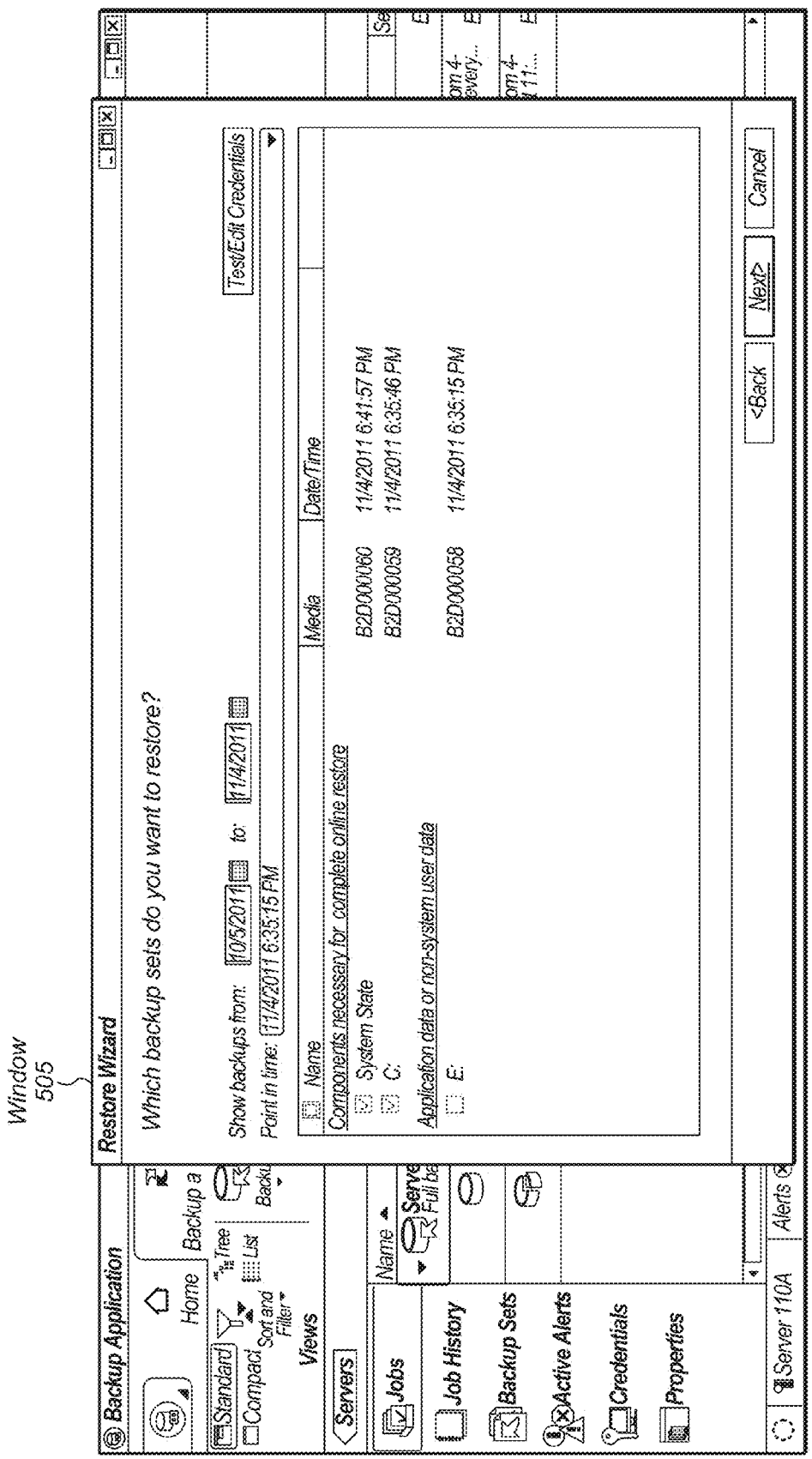
FIG. 5 illustrates one embodiment of a restore window in a user interface.

Turning now to FIG. 5, one embodiment of a restore window in a user interface is shown. Window 505, labeled "Restore Window", may be generated by the backup application user interface in response to an administrator initiating a restore operation. In one embodiment, window 505 may be generated to allow an administrator to restore a server executing a Microsoft Windows operating system for which all necessary components were backed up.

In window 505, an administrator may select a specific backup job from a specific point-in-time with which to restore a server. Then, after choosing a specific backup job, window 505 may display the components of the backup job at a high-level. The components may be displayed in two different sections. The first section may display critical components, which are labeled "Components necessary for complete online restore" in window 505. These critical components include System State and the C: volume, and each of these components is selected with a check-mark. The critical components shown in window 505 are illustrative of the critical components that may have been backed up for a server in one scenario. Other backup jobs may have other numbers and types of critical components. The second section of window 505 may display non-critical components, which are labeled "Application data or non-system user data" in window 505. The E: volume is listed as the only non-critical component in window 505. The administrator may have the option of including the non-critical components in the restore operation by selecting them in window 505.

It is noted that other non-critical components may be listed in window 505 in other embodiments. Additionally, in another embodiment, a third section may be displayed in window 505, for non-critical devices that cannot be recovered until a subsequent recovery pass. For example, if a Microsoft® SQL Server® or Microsoft® Exchange® Server is included in the simplified system protection backup but a non-file based technology (e.g., application proprietary streaming interface) was used during the backup and if the corresponding application is not present and/or not executing, then these non-critical components will not be able to be restored and may be listed in a third section of window 505. In contrast, if a file based technology (e.g., snapshot) was used for the backup or if the corresponding application is present and executing, then these non-critical components may be listed in the second section of window 505.

During a recovery operation for a server, the simplified disaster recovery tool may validate that all of the critical devices are being recovered. This is indicated in window 505 by the check-mark next to each of the critical components. All of the critical components may be recovered as a collection by the simplified disaster recovery tool. The simplified disaster recovery tool may also validate that the non-critical devices can be recovered based on stored metadata and the interrogation of the current recovery environment via operating system and application proprietary interfaces. If a critical device cannot be recovered or is not available for recovery, then the recovery operation will result in a failure. If a non-critical device cannot be recovered, the recovery may continue and the specific unrecoverable non-critical device may be reported in the user interface.

Figure 6:
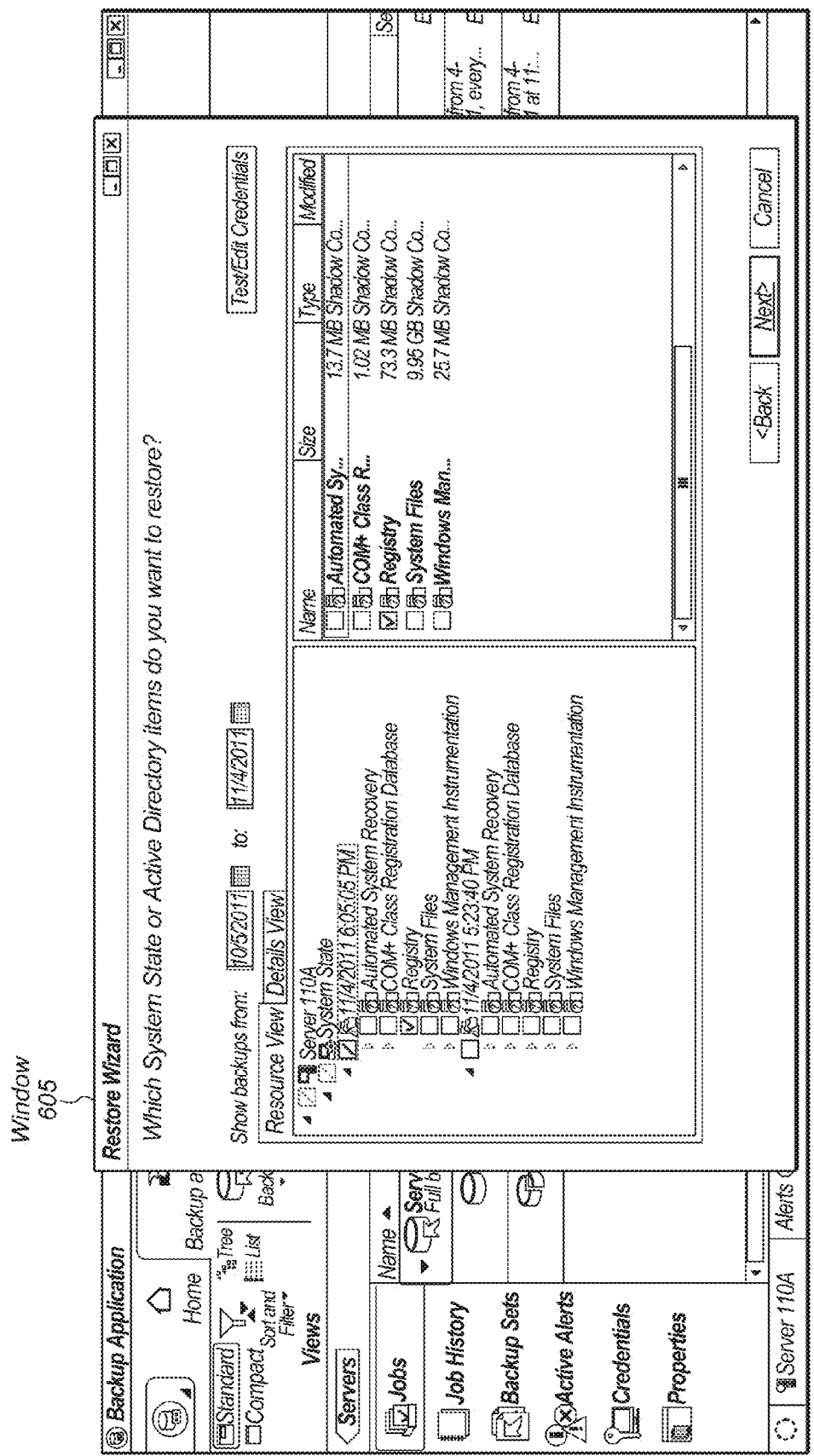
FIG. 6 illustrates one embodiment of another restore window in a user interface.

Referring now to FIG. 6, one embodiment of another restore window in a user interface is shown. Window 605 may be generated for an administrator wishing to restore individual items from Active Directory or System State. This is an alternative to restoring the entire operating system, and allows an administrator to restore individual components from previous backup jobs. As shown in window 605, two separate point-in-time System State backups are displayed, and the administrator has selected to restore the Registry from one of the backups. This selection is merely illustrative, and the administrator may select other components in other embodiments. Also, in other embodiments, other components may be listed in window 605 and available for restoration.

Figure 7:
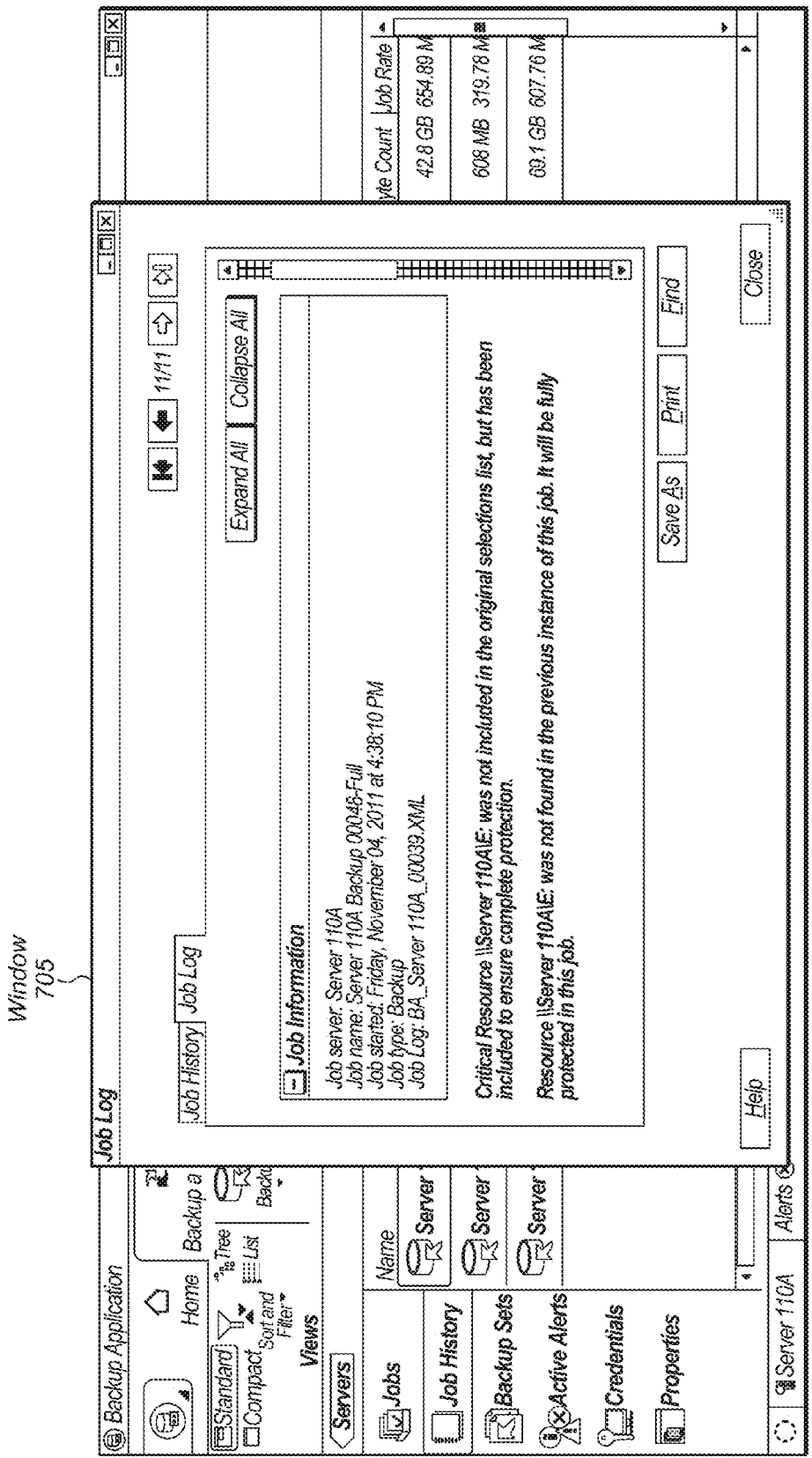
FIG. 7 illustrates one embodiment of job log window within a user interface.

Turning now to FIG. 7, one embodiment of a job log window within a user interface is shown. A backup of one of the servers in the overall system may be performed, and as part of the backup, a discovery process may be performed to identify the critical devices of the given server. In some embodiments, the current discovery process may be compared to previous discovery processes that were performed for earlier backup jobs. The critical devices may have been identified in an earlier discovery process, and the critical devices identified in the current discovery process may be compared to the critical devices identified in the most recent discovery process.

Job log window 705 is shown in FIG. 7, and job log window 705 may be generated within the user interface in response to detecting a critical device in the discovery process that was excluded from the list of devices to be protected. This is reported in the following message within job log window 705: "Critical Resource \\Server 110A\E: was not included in the original selections list, but has been included to ensure complete protection." This notifies the administrator that their manual selection of components did not include all of the critical components necessary for a full system restore. The missing critical component may be automatically selected by the backup application in spite of being excluded by the administrator. This prevents a backup from being performed that would be incapable of fully restoring the system if a recovery is needed at some future point.

Also, job log window 705 reports that a new critical system device (E: volume) has been detected during the current discovery process. The warning appears with the following message: "Resource \\Server 110A\E: was not found in the previous instance of this job. It will be fully protected in this job." In general, this warning may be generated to inform the administrator of any new critical devices which have not been previously backed up. Job log window 705 may alert the administrator that a new critical device has been discovered on the server. As shown, E: is a volume that was identified as a critical device in the current discovery process, and as indicated in window 705, E: was not found in the previous instance of this job. The E: volume may have been added since the most recent backup, which accounts for why it was not in the previous instance of the job. Alternatively, the E: volume may have been a non-critical device on a previous backup job, and may have become critical since the last backup job. As a result of being identified during the current discovery process, the new critical device (E: volume) may be automatically added to the set of critical devices that are backed up by the simplified disaster recovery tool, and this may take place without any action from the administrator. Job log window 705 may be a notification to the administrator that the new critical device (E: volume) is being backed up with the other critical devices.

It is noted that other job log windows may be generated for other scenarios that may be encountered in a backup job. For example, if a non-critical component is included in a backup job (full, incremental, or differential) and then is excluded from the next backup job, this may be reported in a job log window to inform the administrator. In general, the exclusion of an existing device (critical or non-critical) or the inclusion of new device (critical or non-critical) in a backup job may result in a job log window being generated to notify the administrator.

Figure 8:
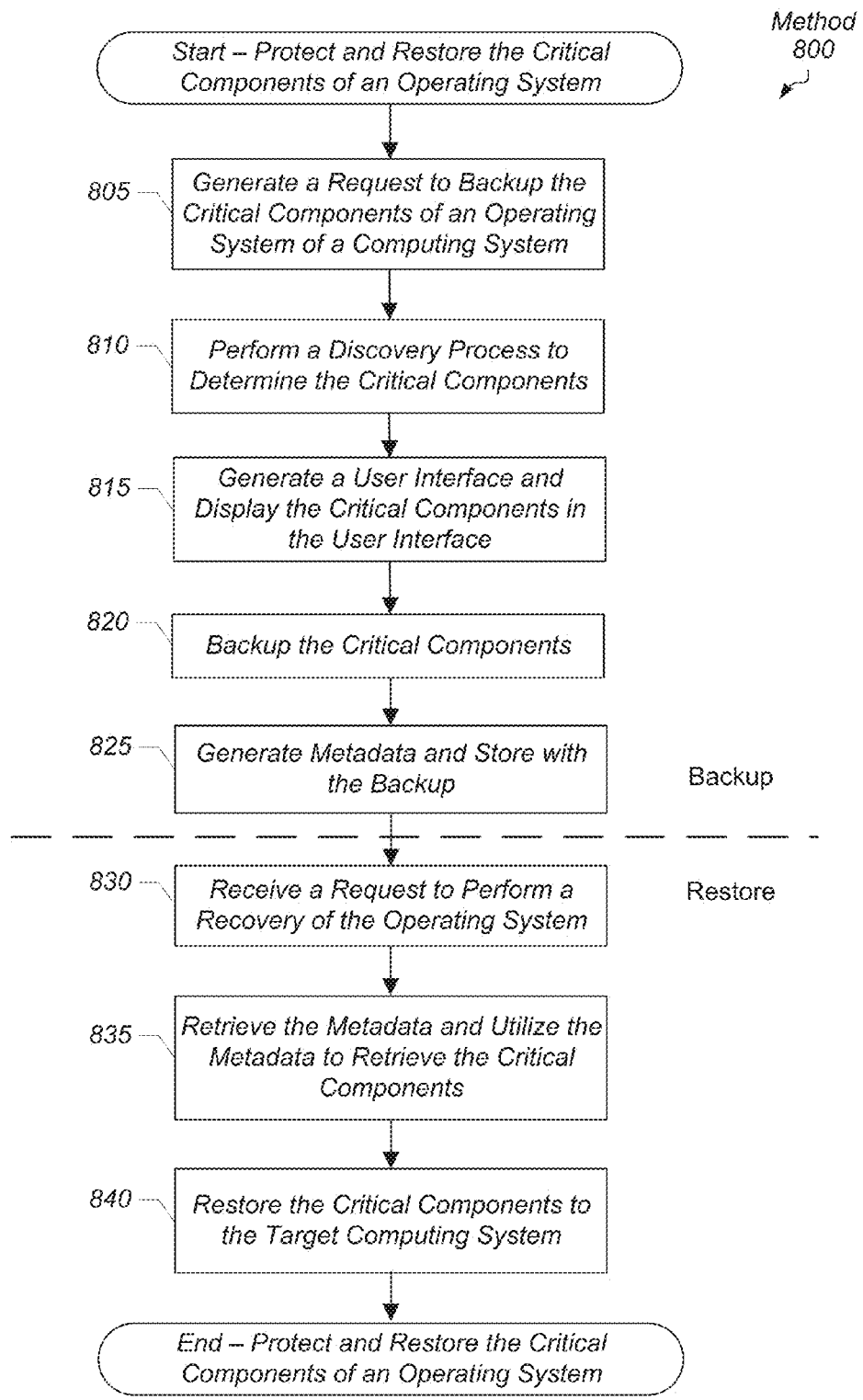
FIG. 8 is a generalized flow diagram illustrating one embodiment of a method for protecting and restoring the operating system of a computing device.

Referring now to FIG. 8, one embodiment of a method for protecting and restoring the operating system of a computing system is shown. In one embodiment, method 800 may be performed by a software application executing on one or more processors of a computing system. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired.

In one embodiment, a request to perform a backup of the critical components of an operating system of a computing system may be generated (block 805). In various embodiments, the computing system may be a server (e.g., applications server, media server), computer, laptop, smartphone, tablet, or other device. The request may be generated in a variety of ways. For example, a user may initiate the backup of the critical components via a user interface of a backup application. Alternatively, a backup application may initiate the backup according to a schedule (e.g., daily, weekly). In one embodiment, the backup application may execute on a backup server that is connected to the computing system directly or over a network. The backup application may communicate with a software agent or application running on the computing system. Alternatively, the backup application may execute on the computing system.

In response to the backup request being generated, a discovery process may be performed to determine the critical components of the computing system (block 810). The critical components are the components which are required for restoring the operating system to an operational state, and the critical components may include fewer than all of the plurality of components of the operating system. The critical components enable the operating system to boot up properly and achieve a functional state. Once the operating system has reached the functional state, subsequent recovery passes may restore non-critical components, application data, and user data.

In one embodiment, the operating system of the computing system may be a Microsoft® Windows® operating system, though other operating systems are possible and are contemplated. In this embodiment, the discovery process may include querying the system volume, boot volume, and service control manager. The system volume refers to the disk volume that contains the hardware-specific files that are needed to start Windows. The boot volume refers to the disk volume that contains the Windows operating system files and the supporting files. The service control manager keeps track of all running software processes and maintains a database of installed services and driver services that allow the operating system to start successfully. API calls may be invoked to query the various volumes and components. In other embodiments, other operating systems may be utilized, and the components that are queried during the discovery process may vary depending on the operating system. In various embodiments, the backup application may load a configuration file with detailed information for determining the critical components for the specific operating system being utilized by the computing system. The discovery process may be based on the information contained in the configuration file.

The critical components may be discovered during the discovery process. If a previous discovery process was performed for a previous backup, then the discovered critical components in the current discovery process may be compared to the previous discovery process. If a new critical component is discovered in the current discovery process, then the new critical component may be automatically included in the backup without user intervention. If the current backup is an incremental backup, then the incremental backup may be converted to a full backup for the new critical component. All other data may still be backed up on an incremental basis, but the backup of the new critical component may become a full backup. Also, if the current backup is a differential backup, then the differential backup may be converted to a full backup for the new critical component.

In one embodiment, a user interface may be generated, and the discovered critical components may be displayed in the user interface (block 815). In some embodiments, those components that were discovered and determined to be non-critical components may be displayed in the user interface, and these non-critical components may be labeled as non-critical to inform the administrator of their status. In one embodiment, within the user interface, the administrator may be able to select which components are included in a backup. If the user excludes one or more critical components from the selection of components to be backed up, the excluded critical components may still be included in the next backup anyway. A log may be generated in the user interface to inform the administrator that they have excluded a critical component and that the critical component will be included in the backup in spite of its exclusion. The backup application may override the user decision and backup the excluded critical component with the other critical components.

It is noted that the administrator may make selections within the user interface at various stages during the overall backup process. For example, the user interface may be accessed following a backup job, and the user interface may display the components that were discovered and backed up during the last backup job. Then, the administrator may select components within the user interface, and these selected components may be backed up on the next backup job. When the next backup job is performed, a new discovery process may be performed to re-interrogate the system and determine if the system has changed. The administrator may access the user interface following this discovery process, and the administrator may have the option of changing the selections that were previously made.

Next, a backup of the critical components may be performed (block 820). In one embodiment, the discovery process and backup may be performed automatically without user intervention. In one embodiment, any non-critical components that were identified during the discovery process may be excluded from the backup. Alternatively, one or more non-critical components may be included in the backup if they were selected for inclusion by a user.

Metadata associated with the backup may also be generated and stored with the critical components in the backup (block 825). The metadata may list the critical components that were discovered and backed up. In some embodiments, the metadata may also list an order in which critical components should be restored in the event of a recovery of the backed up operating system.

In various embodiments, the critical components may be backed up as a collection to facilitate a simple recovery process in the event of a disaster or system failure. For example, in one embodiment, the critical components may be backed up in an executable format to a bootable storage medium (e.g., CD, DVD, USB flash drive). During a disaster recovery, the bootable storage medium may be used to boot the system and get the operating system into an operational state. In another embodiment, the critical components may be backed up to a specific location on a storage device in the disaster recovery path of the target computing system. The computing system could then boot from this specific location when recovering from a disaster. Other suitable backup scenarios to accommodate a simplified disaster recovery are possible and are contemplated.

At some later point (shown in the same figure for ease of discussion), which could be immediately after the just-performed backup, or could be many backups later, a request may be received to perform a recovery of the operating system (block 830). The request may be generated due to a disaster, hardware or software failure, or other event. In response to receiving the request to perform a recovery, the backup application may retrieve the metadata from the backup and utilize the metadata to retrieve the stored critical components (block 835). Then, the critical components may be restored to the target computing system (block 840). The target computing system may be the same computing system that was originally backed up or may be a different computing system. After block 840, method 800 may end.

It is noted that the above-described embodiments may comprise software. In such an embodiment, program instructions and/or a database (both of which may be referred to as "instructions") that represent the described systems and/or methods may be stored on a non-transitory computer readable storage medium. Generally speaking, a computer readable storage medium may include any storage media accessible by a computer during use to provide instructions and/or data to the computer. For example, a computer readable storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g., synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM)), ROM, non-volatile memory (e.g. Flash memory) accessible via a peripheral interface such as the USB interface, etc. Storage media may include micro-electro-mechanical systems (MEMS), as well as storage media accessible via a communication medium such as a network and/or a wireless link.

In various embodiments, one or more portions of the methods and mechanisms described herein may form part of a cloud computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Although several embodiments of approaches have been shown and described, it will be apparent to those of ordinary skill in the art that a number of changes, modifications, or alterations to the approaches as described may be made. Changes, modifications, and alterations should therefore be seen as within the scope of the methods and mechanisms described herein. It should also be emphasized that the above-described embodiments are only non-limiting examples of implementations.

What is claimed is:

1. A method comprising:
executing a software application to perform a discovery process of a computing system;
identifying which components of a plurality of components of an operating system of the computing system are critical components, wherein critical components are components which are required for restoring the operating system to an operational state;
generating a user interface and displaying the critical components in a first section of the user interface and displaying non-critical components in a second section of the user interface;
comparing discovered critical components to an administrator's backup selections;
generating a message within the user interface if any critical components have been left out of the administrator's backup selections;
generating metadata to identify the critical components, wherein the metadata is considered a critical component; and
storing the metadata with the backup.

2. The method as recited in claim 1, wherein the discovery process and backup are performed in response to receiving a request from a backup application to perform a backup of the critical components of the operating system of the computing system, and wherein the discovery process comprises:
accessing data which identifies a type of operating system being utilized by the computing system;
loading a configuration file with information on what types of components are critical for the operating system being utilized by the computing system;

querying a system volume, boot volume, and service control manager of the computing system to determine the critical components;
determining auto-start services for the operating system from the service control manager; and
determining a location of required executables from the service control manager.

3. The method as recited in claim 2, the method further comprising:
determining a first component is a critical component during discovery of critical components;
detecting the first component is excluded from a backup request; and
overriding the exclusion and backing up the first component when performing a backup of the critical components.

4. The method as recited in claim 3, the method further comprising showing that simplified disaster recovery is enabled in the user interface, wherein simplified disaster recovery signifies that critical components of the operating system of the computing system are being protected during any backup jobs that are performed.

5. The method as recited in claim 3, wherein the critical components comprise one or more of system files, event logs, registry, windows internet name service, windows management instrumentation, component object model (COM+) class registration database, basic input output system (BIOS), extensible firmware interface (EFI), unified EFI, utility partition volumes, boot device, system services devices, and system state devices.

6. The method as recited in claim 5, wherein the system state devices comprise one or more of an active directory, background intelligent transfer service, certificate services, cluster quorum, COM+ class registration database, dynamic host configuration protocol, event logs, file server resource manager, internet information services, microsoft (MS) search service, network policy server, performance counter, registry, remote storage, removable storage manager, shadow copy optimization, system files, system volume, task scheduler, terminal server licensing, terminal services gateway, volume shadow copy service (VSS) express writer, windows deployment services, windows internet name service, and windows management instrumentation.

7. The method as recited in claim 1, the method further comprising:
receiving a request to perform an incremental backup of the computing system;
comparing critical component information from a current discovery process to critical component information from a previous discovery process; and
responsive to detecting a new critical component during the current discovery process, converting the incremental backup to a full backup for the new critical component.

8. A non-transitory computer readable storage medium comprising program instructions, wherein when executed the program instructions are operable to:
execute a software application to perform a discovery process of a computing system;
identify which components of a plurality of components of an operating system of the computing system are critical components, wherein critical components are components which are required for restoring the operating system to an operational state;
generate a user interface and display the critical components in a first section of the user interface and display non-critical components in a second section of the user interface;
compare discovered critical components to an administrator's backup selections;
generate a message within the user interface if any critical components have been left out of the administrator's backup selections;
generate metadata to identify the critical components, wherein the metadata is considered a critical component; and
store the metadata with the backup.

9. The non-transitory computer readable storage medium as recited in claim 8, wherein the discovery process and backup are performed in response to receiving a request from a backup application to perform a backup of the critical components of the operating system of the computing system, and wherein the discovery process comprises:
accessing data which identifies a type of operating system being utilized by the computing system;
loading a configuration file with information on what types of components are critical for the operating system being utilized by the computing system;
querying a system volume, boot volume, and service control manager of the computing system to determine the critical components;
determining auto-start services for the operating system from the service control manager; and
determining a location of required executables from the service control manager.

10. The non-transitory computer readable storage medium as recited in claim 9, wherein the program instructions are further operable to:
determine a first component is a critical component during discovery of critical components;
detect the first component is excluded from a backup request; and
override the exclusion and backing up the first component when performing a backup of the critical components.

11. The non-transitory computer readable storage medium as recited in claim 10, wherein the program instructions are further operable to show that simplified disaster recovery is enabled in the user interface, wherein simplified disaster recovery signifies that critical components of the operating system of the computing system are being protected during any backup jobs that are performed.

12. The non-transitory computer readable storage medium as recited in claim 10, wherein the critical components comprise one or more of system files, event logs, registry, windows internet name service, windows management instrumentation, component object model (COM+) class registration database, basic input output system (BIOS), extensible firmware interface (EFI), unified EFI, utility partition volumes, boot device, system services devices, and system state devices.

13. The non-transitory computer readable storage medium as recited in claim 12, wherein the system state devices comprise one or more of an active directory, background intelligent transfer service, certificate services, cluster quorum, COM+ class registration database, dynamic host configuration protocol, event logs, file server resource manager, internet information services, microsoft (MS) search service, network policy server, performance counter, registry, remote storage, removable storage manager, shadow copy optimization, system files, system volume, task scheduler, terminal server licensing, terminal services gateway, volume shadow copy service (VSS) express writer, windows deployment services, windows internet name service, and windows management instrumentation.

14. The non-transitory computer readable storage medium as recited in claim 8, the program instructions are further operable to:
   receive a request to perform an incremental backup of the computing system;
   compare critical component information from a current discovery process to critical component information from a previous discovery process; and
   responsive to detecting a new critical component during the current discovery process, convert the incremental backup to a full backup for the new critical component.

15. A system comprising:
   a computing system, wherein the computing system is configured to execute an operating system; and
   a server, wherein the server is coupled to the computing system and configured to execute a backup application;
   wherein the backup application is configured to:
      execute a process to perform a discovery process of a computing system;
      identify which components of a plurality of components of an operating system of the computing system are critical components, wherein critical components are components which are required for restoring the operating system to an operational state;
      generate a user interface and display the critical components in a first section of the user interface and display non-critical components in a second section of the user interface;
      compare discovered critical components to an administrator's backup selections;
      generate a message within the user interface if any critical components have been left out of the administrator's backup selections;
      generate metadata to identify the critical components, wherein the metadata is considered a critical component; and
      store the metadata with the backup.

16. The system as recited in claim 15, wherein the discovery process and backup are performed in response to receiving a request to perform a backup of the critical components of the operating system of the computing system, and wherein the discovery process comprises:
   accessing data which identifies a type of operating system being utilized by the computing system;
   loading a configuration file with information on what types of components are critical for the operating system being utilized by the computing system;
   querying a system volume, boot volume, and service control manager of the computing system to determine the critical components;
   determining auto-start services for the operating system from the service control manager; and
   determining a location of required executables from the service control manager.

17. The system as recited in claim 16, wherein the backup application is further operable to:
   determine a first component is a critical component during discovery of critical components;
   detect the first component is excluded from a backup request; and
   override the exclusion and backing up the first component when performing a backup of the critical components.

18. The system as recited in claim 17, wherein the backup application is further operable to show that simplified disaster recovery is enabled in the user interface, wherein simplified disaster recovery signifies that critical components of the operating system of the computing system are being protected during any backup jobs that are performed.

19. The system as recited in claim 17, wherein the critical components comprise one or more of system files, event logs, registry, windows internet name service, windows management instrumentation, component object model (COM+) class registration database, basic input output system (BIOS), extensible firmware interface (EFI), unified EFI, utility partition volumes, boot device, system services devices, and system state devices.

20. The system as recited in claim 15, wherein the backup application is further operable to:
   receive a request to perform an incremental backup of the computing system;
   compare critical component information from a current discovery process to critical component information from a previous discovery process; and
   responsive to detecting a new critical component during the current discovery process, convert the incremental backup to a full backup for the new critical component.

* * * * *